Dec. 8, 1970   A. B. SHIMP   3,546,567
TIME-PROPORTIONING SINGLE AND POLYPHASE POWER CONTROLLERS
Filed March 29, 1968   4 Sheets-Sheet 1

INVENTOR
Alan B. Shimp.
BY
HIS ATTORNEYS

INVENTOR
Alan B. Shimp.
BY
HIS ATTORNEYS

Dec. 8, 1970          A. B. SHIMP          3,546,567

TIME-PROPORTIONING SINGLE AND POLYPHASE POWER CONTROLLERS

Filed March 29, 1968          4 Sheets-Sheet 4

INVENTOR
*Alan B. Shimp.*
BY

HIS ATTORNEYS

United States Patent Office  3,546,567
Patented Dec. 8, 1970

3,546,567
TIME-PROPORTIONING SINGLE AND POLYPHASE POWER CONTROLLERS
Alan B. Shimp, Pittsburgh, Pa., assignor to Norbatrol Electronic Corporation, Murrysville, Pa., a corporation of Pennsylvania
Filed Mar. 29, 1968, Ser. No. 717,272
Int. Cl. G05f 1/44
U.S. Cl. 323—18                             8 Claims

ABSTRACT OF THE DISCLOSURE

The power controller switches and proportions current flows between an A.C. source and an A.C. load. The controller incorporates a number of controlled semi-conductors coupled between the load and source with each of the controlled semi-conductors having a gate circuit. A pilot SCR is connected in each of the gate circuits and to a static switch circuit for firing the pilot SCR's to trigger the controlled semi-conductors in advance of current reversals. Logic circuit means are provided for interrelating the activity of the pilot semi-conductors. Accordingly, the controlled semi-conductors are fired respectively and precisely at the instant of such reversals.

---

Figure 1A:
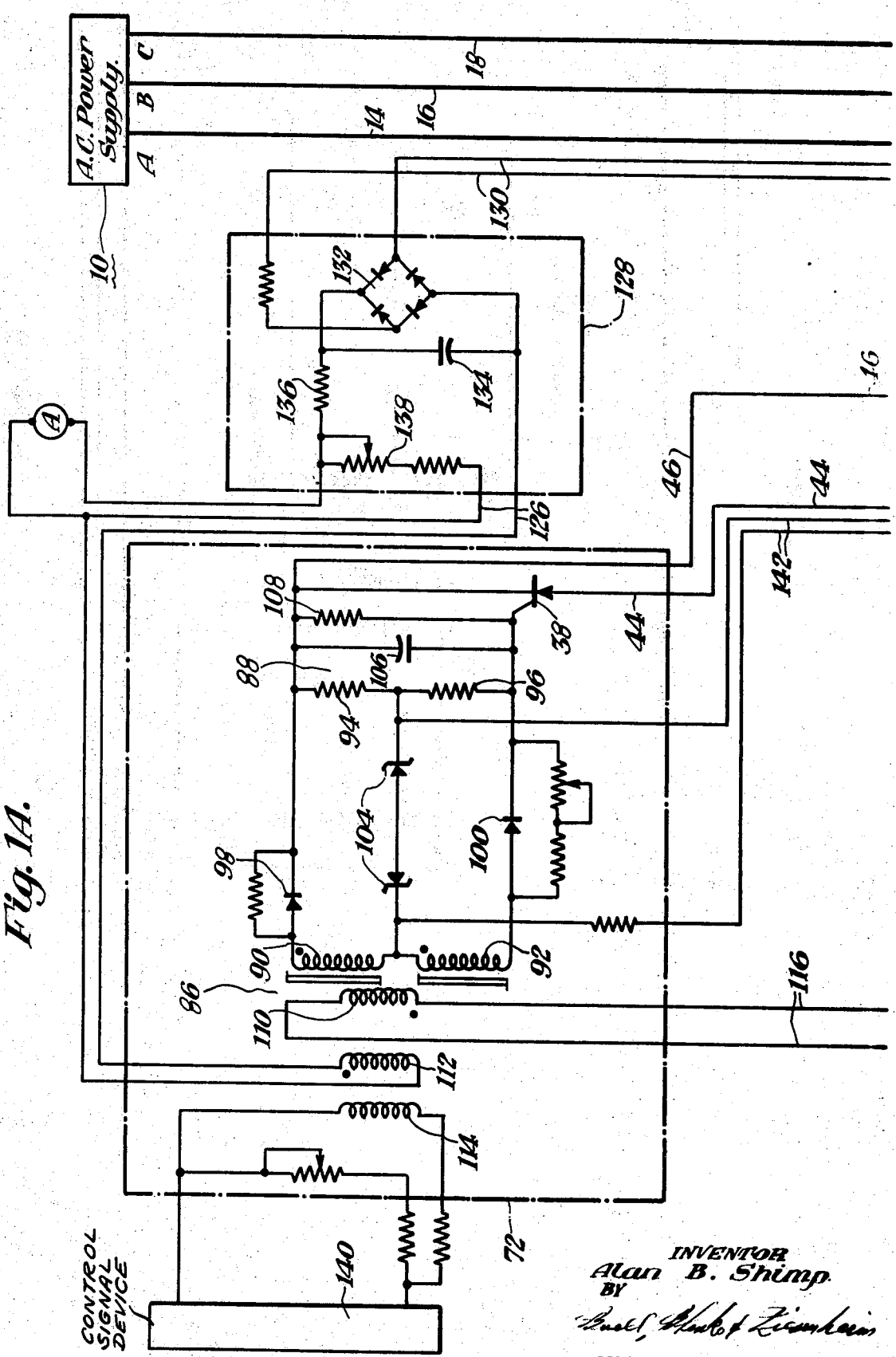

The present invention relates to power controllers arranged for single and polyphase operations respectively, and more particularly to power controllers which operate in accordance with a time-proportioning mode. The power controllers are particularly adapted for handling heavy single or polyphase electrical loads, for example, the high-current loads of single and polyphase electric heating elements.

When handling heavy electrical loads such as those mentioned above, several problems are created when the heavy loads are switched on or off. Ordinary mechanical switches and circuit breakers, for example, are subjected to severe mechanical and electrical wear (arcing) where employed for frequent switching of heavy electrical loads. When switching these loads in the vicinity of sensitive electrical equipment such as computers, broadcasting transmitters and receivers, considerable radio frequency (RF) noise is created which interferes with the proper operation of these components. This is particularly true in the case of computers used or housed in a building which is heated electrically. The heating thus employed, as in the case of many other heating elements, are frequently controlled by proportional thermostats causing the heating current to flow intermittently at longer or shorter intervals depending upon the temperature cycle. These thermostats usually emit a relatively small D.C. signal.

It is well known that RF noise results from the random switching of power supplies for heavy electric loads, with the result that a steep rate of current rise occurs. The steep slope of the current curve leads to the induction of intolerable RF noise, insofar as the aforementioned and other sensitive electronic equipment is concerned.

RF noise can be avoided by using an A.C. supply for these electrical loads and by switching the loads on or off precisely when the associated, sinusoidal current curves pass through zero. In a single phase circuit this means that the current must be switched precisely at the beginning of any given half cycle. In a polyphase electrical supply, the several phases must be turned on or off precisely at a predetermined number of electrical degrees apart, depending on the number of phases, so that each phase is turned on or off precisely as its associated current curve passes through zero.

For proper operation of certain electrical loads it is desirable to avoid imposing a D.C. component upon the A.C. output. This is important, for example in electrically heated glass melting furnaces to prevent electrolytic action and damage to the electrodes.

Previous power controllers have not been able to accomplish this. For example, in James 3,259,825 the SCR is apparently fired only at the beginning of positive half-cycles to control the average amplitude of voltage supplied to an electric motor. Although the current is apparently switched at a substantially zero value, James does not teach the switching of such current for a purely A.C. load.

Although Harriman 3,097,314 discloses a pair of back-to-back SCR's in a single phase circuit, which are turned off at the end of a given cycle, he does not disclose how the switching can be controlled by a small D.C. control signal or how the average voltage or average current output of the power controller can be made proportional to the control signal input.

A number of back-to-back SCR and diode systems are disclosed by Mueller et al. 3,332,008 for controlling power in a polyphase circuit. Mueller et al., however, do not disclose a power controller capable of being actuated by a small control signal, nor a controller in which a small pilot SCR or the like is employed to gate or turn on a large power SCR and the like. Although Naber 3,284,690 employs sequenced-fired SCR's by transformer coupling, he does not disclose the use of logic transformers or equivalent to precisely time the sequenced-firing.

Ogle 3,307,094 discloses a power controller having a time proportioning mode involving numbers of integral A.C. half-cycles. Switching single or polyphase power supplies precisely as the current passes through zero, however, is not disclosed as contemplated by applicant, nor does Ogle or other references disclose a controller having a pure A.C. output, i.e., an output involving only integral full A.C. cycles in avoidance of a D.C. component.

In none of these references is the ratio of the number of on to off cycles varied by an integrated feedback circuit which supplies a fedback signal proportional to the output of the power controller. Previously proposed power controllers have not been able, with a constant control signal, to maintain the output of the controller constant irrespective of inadvertent fluctuations in the A.C. supply at the same time provide switching at precisely zero current levels.

Other types of conventional power controllers are based on the principle of changing the phase angle. The latter controllers are unsatisfactory because of the aforementioned induced RF noise which disrupts computer operation and interferes with the proper operation of other electronic equipment. As mentioned preivously, such noise can be prevented by turning the heavy electrical loads on and off precisely at the instant the sinusoidal current or currents pass through zero.

I overcome these disadvantages of the prior art by providing power controllers suitable for switching heavy single phase and polyphase currents respectively. My novel power controller whether arranged for single phase or polyphase operation is based upon essentially the same principles of operation. A feature of my invention is to the use of one or more pilot controlled semi-conductors, which are susceptible to gating by a very small control signal, in the gating circuit of a like number of large or power controlled semi-conductors. The novel power controllers are arranged so that a pure A.C. output is obtained without a superimposed D.C. current or voltage, as will be evident from the following detailed description. Each of the power controllers includes a control circuit for gating the one or more pilot controlled semi-conductors precisely at the instant the sinusoidal supply current or currents pass through zero. Hence, the one or more power controlled semi-conductors are similarly gated. As a result radio frequency noise is avoided completely.

In the following exemplifications of my invention "silicon controller rectifiers" (SCR's) are sometimes employed as the aforementioned controlled semi-conductors. However, as used generically herein, the term "controlled semi-conductors" is deemed to the inclusive of SCR's. thyristors, controlled rectifiers, triacs (bidirectional controlled semi-conductors or rectifiers), and equivalent devices, as desired for specific applications of the invention.

My novel power controller can be actuated by a suitable D.C. control signal which may be either constant or varying. For example, the control signal can be supplied by a proportional thermostat usually employed in conjunction with many types of electrical heating elements. The ratio of on to off cycles is varied by an integrated feedback which supplies a signal proportional to controller output. My novel controllers provide constant outputs irrespective of changes in A.C. supply voltage. Finally, I provide power controllers that will function independently of the power factor or balance of the loads controlled thereby.

I accomplish these desirable results by providing a power controlling circuit for switching and proportioning current flows between an A.C. source and an A.C. load, said circuit comprising a number of power controlled semi-conductors coupled between said load and said source, a gate circuit for each of said controlled semi-conductors, a pilot controlled semi-conductor connected in each of said gate circuits, and a static switching circuit for firing said pilot controlled semi-conductors to trigger said power controlled semi-conductors in advance of the respective current reversals at said power controlled semi-conductors, so that the succeeding current reversals by said source fire said controlled semi-conductors respectively and precisely at the instant of such reversals.

I also desirably provide a similar power controller wherein an integrating feedback circuit is coupled to said load and to said static switch for supplying an averaged feedback signal to said switch in opposition to a control signal supplied to said switch.

I also desirably provide a similar power controller wherein the time constant of said feedback circuit is about one order of magnitude slower thna that of said static switch to enhance the effect of the fedback signal upon said static switch.

I also desirably provide a similar power controller wherein said static switch includes a gating circuit for one of said pilot controlled semi-conductors, the remainder of said pilot controlled semi-conductors are slaved to said one pilot controlled semi-conductor through logic transformers, and saturating and unsaturating circuit means are provided for each of said logic transformers for firing said transformers in a predetermined timed sequence.

I also desirably provide a similar power controller wherein said pilot controlled semi-conductors are coupled to gate circuits including secondary windings respectively of a pulse transformer, said pilot controlled semi-conductors have their anode-cathode circuits coupled respectively to the windings of a saturable reactor, and said static switch includes an additional controlled semi-conductor coupled in by-passing relation to said saturable reactor.

I also desirably provide similar power controllers arranged specifically for single and polyphase operations, respectively.

During the foregoing discussion, various objects, features and advantages of the invention have been set forth. These and other objects, features and advantages of the invention together with structural and circuit details thereof will be elaborated upon during the forthcoming description of certain presently preferred embodiments of the invention and presently preferred methods of practicing the same.

Figure 1B:
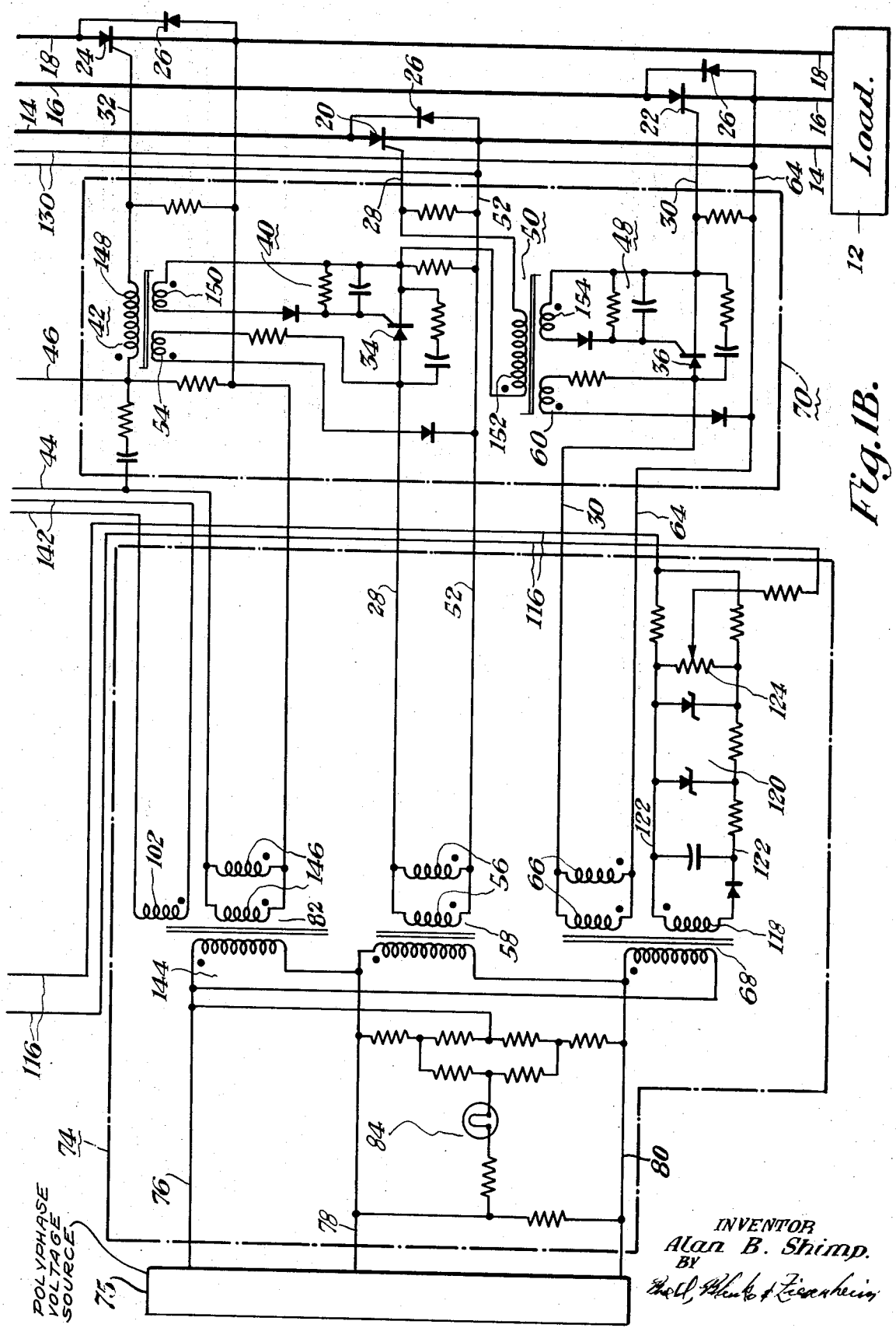
Figure 2A:
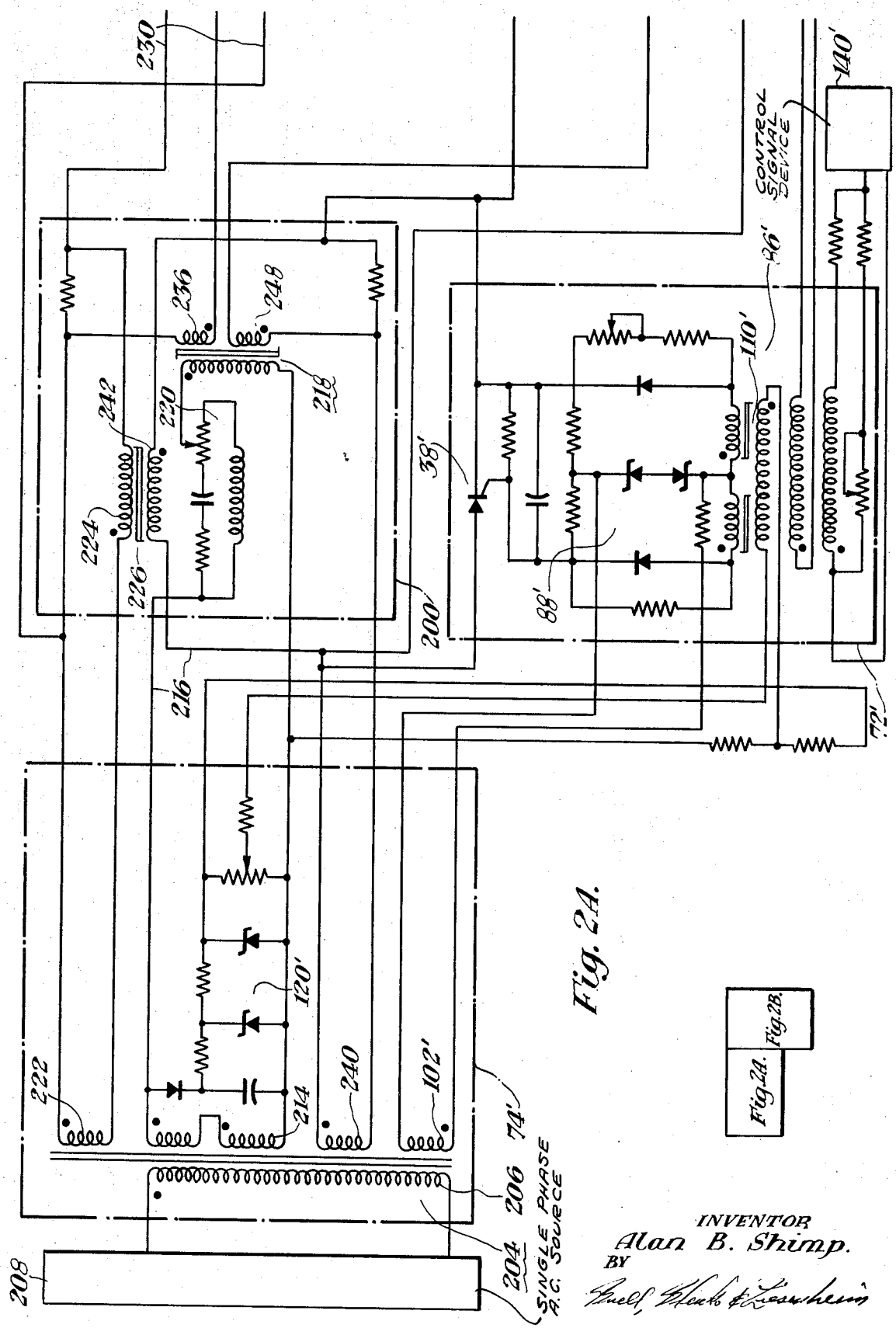
Figure 2B:
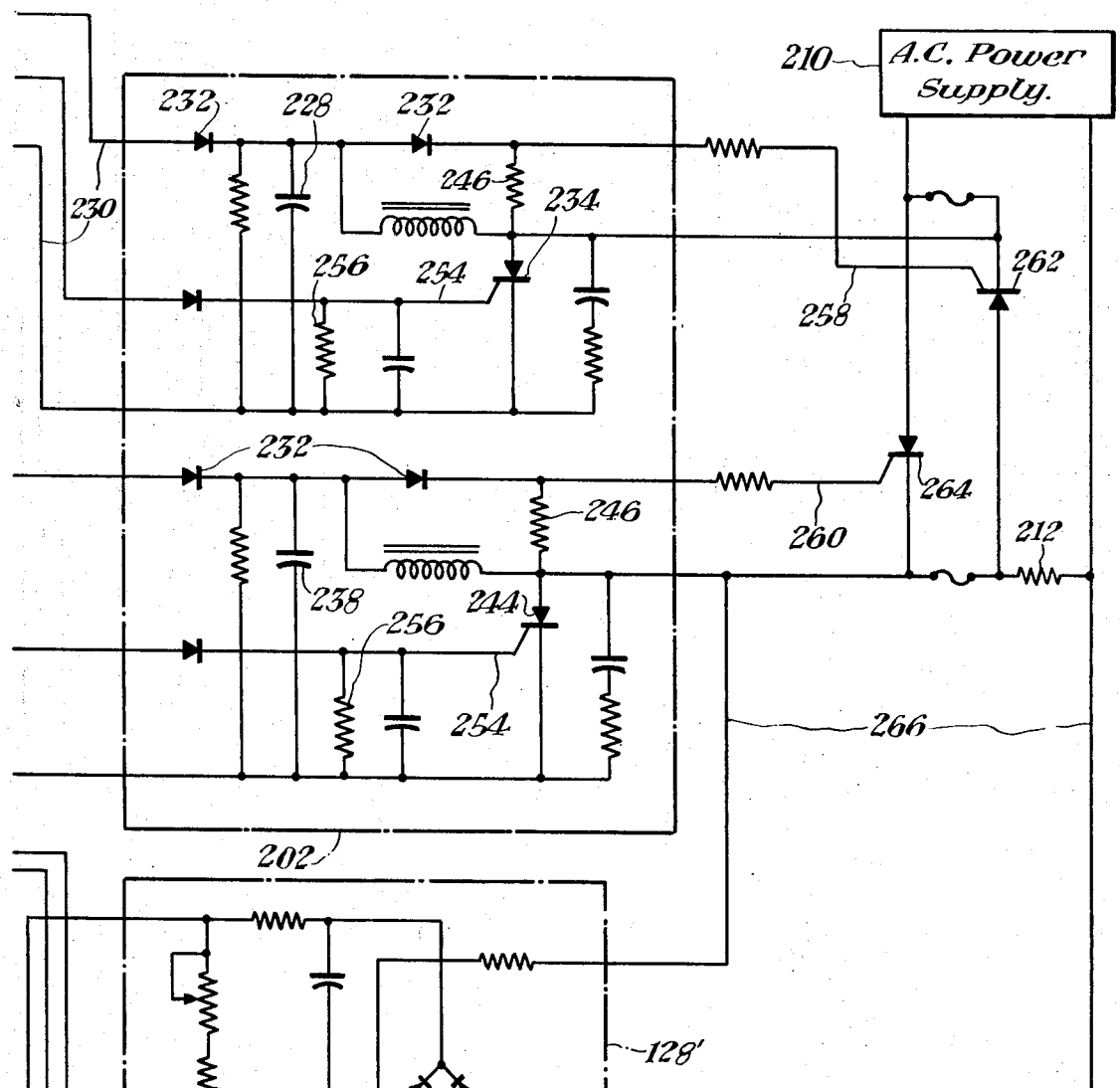
Figure 3:
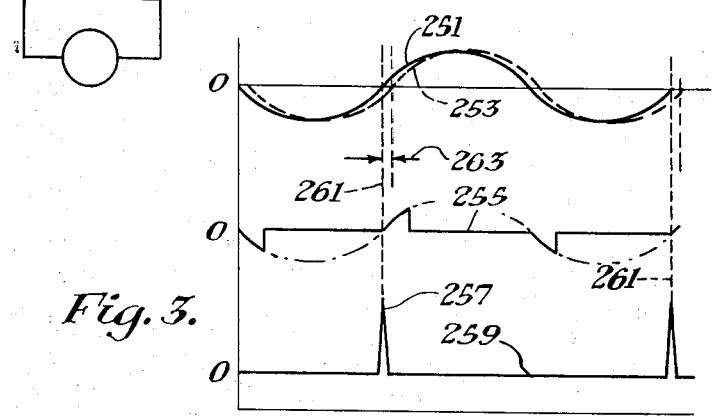

In the accompanying drawings I have shown certain presently preferred embodiments of the invention and have illustrated certain presently preferred methods of practicing the same, wherein:

FIGS. 1A and 1B together show a composite schematic circuit of one form of my novel power controller arranged for switching a polyphase load circuit; and FIGS. 2A and 2B together show a composite schematic circuit of another form of my novel power controller arranged for switching a single phase load circuit; and FIG. 3 is a graph illustrating certain phase relationships in the circuit of FIGS. 2A and 2B.

Referring now more particularly to FIGS. 1A and 1B of the drawings, the power controller shown therein is arranged for polyphasal use and is exemplarily arranged for controlling a three-phase power supply 10. The power supply 10 is coupled to load 12 through conductors 14, 16 and 18, in each of which is a silicon controlled rectifier (SCR) or equivalent control rectifier device 20, 22, or 24 respectively. The cathode and anode circuits of the SCR's 20–24 are thus coupled to conductors 14–18 respectively while their gates are coupled to the polyphasal output of the power controlling circuit presently to be described.

A diode 26 is connected back-to-back with each of the SCR's 20–24 to prevent, in this example, the application of negative voltages to the SCR's 20–24 and to aid in applying a purely A.C. voltage to the load 12. This circuit arrangement enables the associated SCR's to fire successively at the instant the current in the respective conductors 14–18 goes positive. Before the SCR's 20–24 fire in this manner they must be presently gated in a predetermined, timed sequence by the novel power controller circuit of my invention which will now be described in greater detail.

Gate conductors 28, 30 and 32 of the power SCR's 20–24 respectively are coupled to pilot controlled rectifier devices such as SCR's 34, 36 and 38, each of which is fired at a predetermined interval before the current through its associated power SCR 20, 22 or 24 goes positive. This applies successive pregating voltages to the power SCR's 20–24 via their gate circuits 28–32, such that each power SCR is pre-triggered, so to speak, and the current in its associated conductor 14, 16 or 18 passes through zero in the positive direction.

The pilot SCR 38 may be termed a master pilot SCR and the remaining SCR's 34, 36 slave pilots SCR's. Gate circuit 40 of the slave SCR 34 is coupled through logic transformer 42 to an anode-cathode circuit (conductors 44, 46) of the master pilot SCR 38. In turn, gate circuit 48 of the slave SCR 36 is coupled through logic transformer 50 to the anode-cathode circuit (conductors 28, 52) of the first slave SCR 34.

Until the master pilot SCR 38 fires and a signal appears on conductor 46, the logic transformer 42 is normally maintained in its saturated condition through its secondary winding 54, which is connected to the secondary winding 56 of the power transformer 58 through conductors 28, 52. The secondary winding 56 need not be paralleled as shown; rather the usual single winding can be employed depending upon the particular transformer utilized. This applies to other paralleled secondary windings, such as 66 and 146, shown in the drawings. In a similar manner the logic transformer 50 is normally maintained in its saturated condition through its secondary winding 60 coupled to conductors 62, 64 of secondary circuit 66 of power transformer 68. The circuit just described including the pilot SCR's 34, 36 and the logic transformer 42, 50 constitute a polyphase pulsing circuit denoted generally by reference character 70, the outputs of which are coupled through conductors 28–32 to the gates of the power SCR's 20–24 respectively.

As explained below in greater detail the operation of the pulsing circuit 70 is initiated by the periodic firing of the master pilot SCR 38, which firing is controlled by a mixer-amplifier circuit denoted generally by reference character 72. The mixer-amplifier 72 and the pulsing circuit 70 are supplied by a polyphase power supply 74 which is coupled to a source 75 of polyphase voltage through input conductors 76–80. In this example, the last-mentioned polyphase source must be in phase with the polyphase load supply 10. The supply conductors 76–80 in this example are connected to the primaries of transformers 82, 58 and 68 in a delta network. A conventional phase sequencing circuit 84 can be included, if desired, in the aforementioned primary circuit.

The mixer-amplifier 72 includes, in this example, a double toroid magamp denoted generally by reference character 86 and a gate circuit 88 coupled to the gate and cathode of master pilot SCR 38 on the one hand and to output windings 90, 92 of the magamp 86. The gate circuit 88 is essentially a regulated bridge circuit having A.C. and D.C. inputs and load resistances 94, 96. The D.C. input is supplied at predetermined intervals when the magamp 86 fires, via diodes 98, 100 to apply a fully rectified D.C. component to the bridge input. The A.C. component is supplied from secondary winding 102 of the power transformer 82 of the polyphase supply 74 and is regulated by a pair of back-to-back Zener diodes 104.

The bridge output on load resistances 94, 96 is averaged, by capacitance 106 and output resistances 108, at the gate of the master pilot SCR. The gate circuit 88 is arranged to supply a gating pulse to the SCR 38 (when the magamp 86 turns on as described below) to fire the master pilot SCR well in advance of the firing of the associated power SCR 24 described in greater detail below. In this example, the interaction between the aforementioned A.C. and D.C. inputs to the bridge or gate circuit 88 causes the SCR 38 to be fired, assuming the magamp is triggered on, at a predetermined and constant number of electrical degrees, for example 30°, after the A.C. input to the bridge circuit 88 goes positive.

The aforementioned lead time can be varied depending upon the application of the invention. However, a predetermined amount of such lead time is essential to allow the operational sequence of the polyphase pulsing circuit 70 to apply proper pregating signals to the power SCR's 20–24 well in advance of the beginning of the next succeeding positive cycle therein. Such pretriggering permits the SCR's 20–24 to be fired precisely at the instant the anode-cathode currents thereof pass through zero in the positive direction.

The magamp 86 forming part of my novel mixer-amplifier 72 is more or less conventional in nature. In addition to its output windings 90, 92 the magamp 86 includes the usual control windings for example biasing winding 110, feedback winding 112 and input winding 114. In this example, the control winding 114 is connected to a control device 140 associated with the load 12 and having a D.C. output or control signal. An exemplarily control device of this character is a proportional thermostat (not shown) associated with electrical heating elements (not specifically shown) as an application of the electrical load 12.

The biasing winding 110 is supplied with positive current on conductors 116 from secondary winding 118 of the power supply transformer 68. A conventional rectifying and regulating circuit denoted generally by reference character 120 is coupled to secondary conductors 122. An output potentiometer 124 of the aforementioned secondary circuit can be adjusted to determine the amount of biasing potential applied to the winding 110.

The feedback winding 112 is connected through conductors 126 to my novel feedback integrating circuit denoted generally at 128. The input of the feedback circuit 128 is coupled across one phase of the polyphasal input to the load 12. In this example, the conductors 130 are connected to load supply conductors 14, 16. The input conductors 130 are coupled to the input of a full-wave rectifier bridge 132, the output of which is supplied to the magamp feedback winding 112. However, the output of the feedback bridge 132 is integrated by means of capacitance 134 and load resistance 136 to provide a substantially rippleless D.C. feedback. In this example the feedback voltage is negative for reasons explained below and is proportional to the increase or decrease in the voltage of polyphase load 12. Most importantly, the integrated output of the feedback circuit 128 is provided with an inherently slow response or relatively large time constant of at least one order greater than the shorter time constant or transport lag of the magamp 86. Desirably, the transport lag of the magamp 86 is of the order of one A.C. cycle in contrast to a transport lag of about 15 cycles in the integrating feedback circuit 128. The substantial difference in transport delays of the magamps 86 and feedback circuit 128, allows the magamp proper time in which to respond to the intelligence supplied by the feedback circuit.

The magamp 86 characteristically triggers on when the net ampere-turns of its control windings 110–114 are positive and triggers off when the net ampere-turns become negative. Thus, the aforementioned control device 140 when actuated, supplies a constant positive signal to input winding 114 which tends to trigger on the magamp 86, while the feedback circuit 128 through feedback winding 112 supplies a varying negative signal which tends to turn the magamp 86 off.

In normal operation, the effects of the control and feedback signals are balanced such that the magamp is triggered less than 100% of the positive half cycles when load current is called for by the control device 140. Then, if the current supplied to the load 12 tends to increase the feedback signal on magamp winding 112 also tends to increase with the result that the magamp 86 is turned on during a lesser number of cycles to counteract the tendency of the load current to increase. On the other hand, a decrease in load current results in the magamp firing a greater number of cycles to compensate such decrease. A constant load current results irrespective of supply voltage fluctuations.

To illustrate the operation of the controlling circuit of FIGS. 1A and 1B, assume that a control signal is received from the control device 140 and that the feedback voltage is such that the magamp 86 is triggered on. At a predetermined point in the sinusoidal current curve of the A.C. voltage supplied through conductors 142 from the secondary winding 102 of transformer 82, the gate circuit 88 of the mixer-amplifier 72 generates a sufficient positive output voltage across resistance 108 to trigger the master pilot SCR 38. As noted above this occurs 30 electrical degrees after each time the A.C. current through supply transformer winding 102 passes through zero in the positive direction when the magamp 86 is triggered on. Of course, when the magamp 86 is triggered off, its output windings 90, 92 are no longer conductive, and little or no voltage is applied to the SCR 38. The SCR 38 therefore is fired at each positive half cycle, when the magamp 86 is turned on, of the phase applied to primary winding 144 of the power transformer 82.

When the master pilot SCR 38 is then gated, it immediately fires by virtue of the fact that its anode-cathode circuit is coupled across in phase secondary windings 146 of the power supply transformer 82. Each time the master pilot SCR is fired a pregating signal is applied to the gate circuit 32 of the power SCR 24, the gate and cathode of which are connected in series with the master pilot SCR 38 and the secondary power transformer windings 146. The power SCR 24 is thereby presaturated by a triggering signal from phase B–A, but is fired later by another phase C–A of the power supply 10, when the current of the latter phase passes through zero. The use of separate phases in this manner for triggering and subsequently firing the power SCR's 20–24 supplies an inherent logic function for precisely sequencing the operation of the power SCR's.

At the same time the signal on conductors 44, 46 passes through primary 148 of the logic transformer 42 and drives the transformer to positive saturation. The next succeeding positive half cycle (conductor 28) 120° later, of the secondary windings 56 of the power transformer 58, drives the logic transformer 42 toward negative saturation, through its secondary winding 54. The momentary unsaturation of the transformer 42 as it passes from positive to negative saturation triggers the gate circuit of the first slave SCR 34 by a pulse from the other secondary winding 150 of the logic transformer 42.

This action immediately fires the first slave SCR 34 the anode of which is coupled to the same power transformer windings 56 as is its gate circuit 40. A gating pulse simultaneously is applied on conductor 28 through primary winding 152 (which is conductive in this example for about half a cycle) of logic transformer 50 to the power SCR 20. SCR 20 is subsequently fired at the instant its related phase current passes through zero in the positive direction. This occurs 120 electrical degrees after the firing of power SCR 24.

At the same time that power SCR 20 is gated the passage of current through primary winding 152 of logic transformer 50 drives this transformer to positive saturation so that it is in condition to be pulsed by its secondary winding 60 upon the next phase current reversal of secondary windings 66 of power supply transformer 68, in the manner described above. Consequently a gating signal is applied to the second slave SCR 36, 120° later as the logic transformer 50 is driven toward negative saturation. The momentary unsaturation of logic transformer 50, through winding 154, supplies a gating pulse to the gate circuit 48 for the second slave SCR 36, which immediately fires as described above with reference to the first slave SCR 34. As a result a pulse is supplied to the gate of power SCR 22 on conductor 30. The latter SCR fires 120° later when its associated phase reverses in the positive direction, in the manner described above.

With this arrangement the polyphasal current from the supply 10 to the load 12 are switched on only at the instant the associated phasal currents pass through zero in the positive direction. The power SCR's 20–24 are pregated by the polyphasal rectified (ripple) output of the pulsing output 70. The aforementioned outputs are coupled to the gates of the power SCR's 20–24 such that the current rises (positive slopes) of the outputs lead the current reversals of the respective polyphasal currents along supply conductors 14–18. In consequence, the use of these phase relationships applies a logic function to the firing of the power SCR's 20–24 such that the SCR's need not be both triggered and fired at the instant the supply currents on conductors 14–18 respectively pass through zero. Triggering in this manner could not be done with sufficient accuracy to avoid RF noise. Instead, the power SCR's 20–24 are triggered in advance of their actual firing as a result of current reversals in their anode-cathode circuits in the positive direction. Thus, there is no transport delay between firing the SCR's 20–24 and the respective instants the supply currents pass through zero in the positive direction.

In the case of the power controlling circuit of FIGS. 2A and 2B for single phase operation the aforedescribed phasal logic function is not available. The single phase circuit of FIGS. 2A and 2B, which will now be described, employs similar mixer-amplifier 72' and feedback integrating circuit 128' but utilizes a phase shifting circuit 200 and pulse amplifier 202 in place of the polyphase pulsing circuit 70. The phase shifter 200 and the pulse amplifier 202 perform additional logic functions to replace that supplied by the out-of-phase relationship described above in connection with my novel polyphase controller. The single phase controller further includes a similar power supply 74' arranged in this example for single phase operation. Thus, the power supply 74' includes a transformer 204 with its primary winding 206 connected to a source 208 of single phase alternating current. The source 208 is in phase with source 210 of alternating potential for load 212.

The supply transformer 204 includes secondary winding 214 to which is coupled D.C. regulating network 120' for the biasing winding 110' of the magamp 86' as described previously (FIGS. 1A and 1B). The secondary winding 214 supplies also an A.C. output on conductors 216 to the primary winding of pulse transformer 218 of the phase shifting circuit 200. In this example, the pulse transformer 218 is of the square loop variety for supplying well-defined pulses. A conventional phase adjusting network 220 is connected in the primary circuit of the pulse transformer 218.

The power transformer 204 includes an additional secondary winding 222 coupled in series with winding 224 of saturable reactor 226 and arming capacitor 228. The capacitor 228 is thus coupled to conductors 230 in which are steering diodes 232 for precharging the capacitor 228 from the power transformer secondary winding 222 when the saturable reactor 226 becomes unsaturated as described below. The steering diodes 232 further direct subsequent discharges of capacitor 228 through the anode-cathode circuit of pilot SCR 234. The pilot SCR 234 is first triggered or gated, as described in greater detail below, by pulses directly from secondary winding 236 of the pulse transformer 218.

In a similar manner arming capacitor 238 can be precharged from power transformer secondary winding 240 when another winding 242 of the saturable reactor 226 is by-passed as explained below. Capacitor 238 is similarly arranged for discharging through the anode-cathode circuit of the other pilot SCR 244 when the latter is gated in the manner described previously. A load resistance 246 is provided for each capacitor 228 or 238. The second pilot SCR 244 is similarly triggered by pulse transformer secondary winding 248.

The anode-cathode circuits of the pilot SCR's 234, 244 are respectively coupled in series with gate circuits 258, 260 of a pair of back-to-back SCR's 262, 264, which in turn are coupled in parallel series between load 212 and its supply 210. The back-to-back arrangement of the power SCR's 262, 264 prevents the imposition of negative potentials thereon and allows the application of A.C. potential to load 212.

When it is desired to energize the load 212, triggering pulses are supplied to the gate circuits 258, 260 of power SCR's. The SCR's 262, 264 subsequently fire at the precise instant that the respective currents therethrough pass through zero in the positive direction. As the current reversals relative to the power SCR's must of necessity be in phase with power transformer windings 222, 240 which supply the pilot SCR's 234, 244, an additional logic function is required to cause the pilot SCR's 234, 244 to anticipate the current reversals relative to the power SCR's 262, 264 so that the power SCR's can be triggered in advance of the current reversals at the power SCR's 262, 264.

This logic function is supplied by the precharging or arminig of the capacitors 228, 238 and the subsequent gating of the pilot SCR's 234, 244 by the pulse transformer windings 236, 246.

The primary logic function of the single phase power controller is supplied by an SCR 38' coupled in by-passing relation to one of the windings of the saturable reactor 226, for example the windings 242, which thereby becomes a slaving circuit coupled to one pilot SCR such as SCR 234. This slaving circuit is responsive to a master circuit including by-passing SCR 38' coupled to the other pilot SCR.

Thus, the power controlling circuit of FIGS. 2A and 2B, like the controller of FIGS. 1A and 1B, can only conduct for integral numbers of full cycles. This feature of the invention is in marked contrast to most known controllers, some of which are designed to conduct for integral numbers of half cycles. When energizing certain types of heating elements, such as electrically heated glass melting furnaces, conventional controllers may be consistently conductive for odd numbers of half cycles, with the accumulative effect of the odd cycle appearing as a D.C. current component. This causes an electrolytic action upon the heating elements and eventually destroys the elements. In this example, gating and firing of the by-passing SCR 38' is controlled in the same manner as described previously in connection with the mixer-amplifier 72 of FIGS. 1A and 1B. Thus, the by-passing SCR 38', when a signal is received from the control device 140' is fired an arbitrary number of electrical degrees (for example 30°) after the current in the regulated A.C. supply from power transformer secondary winding 102' goes positive in bridge circuit 88'. Firing of the by-passing SCR 38' is further controlled by control signals from the control device 140' and by the feedback integrating circuit 128' as described in FIGS. 1A and 1B. In this example, the integrating circuit 128' is connected across the load 212 by conductors 266.

During each period in which the SCR 38' is conductive the resultant shorting of winding 242 of the saturable reactor 226 prevents unsaturating the reactor. Accordingly, the other winding 224 of the reartor 226 no longer periodically blocks the flow of current from power transformer secondary winding 222, and current flows to the associated arming capacitor 228 on the next half cycle. The capacitors 228, 238 therefore are charged on alternate cycles by the currents through the saturable reactor 226 and through the by-passing SCR 38' respectively. These capacitors retain their charges until succeeding positive pulses from the pulse transformer secondary windings 236, 248 are applied respectively to the gates of the pilot SCR's 234, 244. Subsequent discharges of the arming capacitors 228, 238 through the anode-cathode circuits fire the associated pilot SCR's 234, 244. The pilot SCR's are triggered a half cycle apart but slightly in advance of the respective current reversals in the power SCR's 262, 264. Advance triggering signals are thus applied to the gate circuits 258, 260 of the power SCR's 262, 264 which subsequently fire at the instant the respective load currents pass through zero.

The phase adjusting circuit 220 is employed to gate and fire (by phasing the output pulses of the pulse transformer) the pilot SCR's 234, 244 a few electrical degrees prior to the current reversals at the power SCR's 262, 264. This is desirable to avoid gating the power SCR's 262, 264 when their anodes have substantial negative potentials. The phase adjustment 220 also permits "turning" the pulse transformer output to accommodate various power factor relationships of the supply 210 and load 212.

For example, the power SCR voltage is represented by the solid sine curve 251 of FIG. 3 while the load current, i.e., the current through the power SCR's when conducting, is represented by the dashed sine curve 253. As is known, the various unavoidable inductances associated with the power conductors and other circuit components usually cause the load current to lag the voltage slightly. The primary pulse transformer voltage is denoted characteristically by curve 255 of FIG. 3. The voltage peaks 257, of the secondary pulse transformer voltage, represented by curve 259, occurs when the power supply voltage passes through zero as denoted by vertical dashed lines 261. Since these pulses 257 are employed to trigger the pilot SCR's 234, 244 they conveniently occur in advance of the current reversals at the power SCR's 262, 264 as denoted by gap 263. However, where the power current 253 does not lag the power voltage or where a leading current is encountered, the phasing circuit 220 is adjusted to further advance the gating pulses 257.

In order for the pilot SCR's 234, 244 to trigger the power SCR's 262, 264 in this fashion an input must be received from the mixer-amplifier 72', i.e., the by-passing SCR 38' must fire and an input must be received from the pulse transformer 218. This is not a simple AND logic function; rather, both of these inputs must be applied to the pilot SCR's in a predetermined sequence. The by-passing SCR 38' must first be fired to permit charging of the arming capacitors 228, 238 by the saturable reactor 226 and by the anode-cathode circuit of the by-passing circuit 38' respectively. Then, the pilot SCR's can be triggered only by immediately succeeding positive half cycles from the pulse transformer 218. This preserves the timing sequence for pregating each of the power SCR's 262, 264 a predetermined number of electrical degrees in advance of the associated load current reversal.

Accordingly, the power SCR's 262, 264 are alternatively turned on precisely at the instants that their respective currents pass through zero in the positive direction. Of course, the power SCR's switch off at the end of the positive half cycle therethrough, in accordance with their well known characteristics. This process is repeated during succeeding positive half cycles as long as the magamp 86' is unsaturated.

From the foregoing it will be apparent that novel and efficient forms of single and polyphase power controllers have been described herein. In addition, the feedback circuits 128 or 128' cause the magamp 86 or 86' to skip or add cycles of operation to the SCR 38 or 38' to compensate for load voltage and/or current fluctuation. My power controllers entirely avoid the generation of noise and the imposition of D.C. voltages upon their A.C. outputs. While I have shown and described presently preferred embodiments of the invention and have illustrated certain presently preferred methods of practicing the same, it is to be distinctly understood that the invention is not limited thereto but may be variously embodied and practiced within the spirit and scope of the invention.

I claim:

1. A power controlling circuit for switching and proportioning current flows between an A.C. source and an A.C. load, said circuit comprising a number of power controlled semi-conductors coupled between said load and said source, a gate circuit for each of said controlled semi-conductors, a pilot controlled semi-conductor connected in each of said gate circuits, one of said pilot controlled semi-conductors having its cathode connected directly to the gate of the associated power-controlled semi-conductor, a static switching circuit for firing said pilot controlled semi-conductors to trigger said power controlled semi-conductors in advance of the respective current reversals at said power controlled semi-conductors, and at least one of said pilot controlled semi-conductors being slaved to another of said pilot controlled semi-conductors through logic circuit means so that succeeding current reversals by said source fire said power controlled semi-conductors respectively and precisely at the instant of such reversals.

2. A power controlling circuit for switching and proportioning current flows between an A.C. source and an A.C. load, said circuit comprising a number of power controlled semi-conductors coupled between said load and said source, a gate circuit for each of said controlled semi-conductors, a pilot controlled semi-conductor connected in each of said gate circuits and a static switching circuit for firing said pilot controlled semi-conductors to trigger said power controlled semi-conductors in advance of the respective current reversals at said power controlled semi-conductors so that succeeding current reversals by said source fire said controlled semi-conductors respectively and precisely at the instant of such reversals, a remainder of said pilot controlled semi-conductors being slaved to one of said pilot controlled semi-conductors through logic transformer means, and saturating and unsaturating circuit means for said logic transformer means for firing said transformer means in a predetermined timed sequence.

3. A power controlling circuit for switching and proportioning current flows between an A.C. source and an A.C. load, said circuit comprising a number of power controlled semi-conductors coupled between said load and said source, a gate circuit for each of said controlled semi-conductors, a pilot controlled semi-conductor connected in each of said gate circuits, and a static switching circuit for firing said pilot controlled semi-conductors to trigger said power controlled semi-conductors in advance of the respective current reversals at said power controlled semi-conductors so that succeeding current reversals by said source fire said controlled semi-conductors respectively and precisely at the instant of such reversals, said static switching circuit including a gating circuit for one of said pilot controlled semi-conductors, the remainder of said pilot controlled semi-conductors being slaved to said one pilot controlled semi-conductor through logic transformer means, saturating and unsaturating circuit means for said logic transformer means for firing said transformer means in a predetermined timed sequence, and said static switching circuit including a magamp having a pair of load windings, said gating circuit including a bridge circuit having a regulated A.C. input and coupled to said windings for timing the firing of said one pilot controlled semi-conductor.

4. A power controlling circuit for switching and proportioning current flows between an A.C. source and an A.C. load, said circuit comprising a number of power controlled semi-conductors coupled between said load and said source, a gate circuit for each of said controlled semi-conductors, a pilot controlled semi-conductor connected in each of said gate circuits, and a static switching circuit for firing said pilot controlled semi-conductors to trigger said power controlled semi-conductors in advance of the respective current reversals at said power controlled semi-conductors so that succeeding current reversals by said source fire said controlled semi-conductors respectively and precisely at the instant of such reversals, said pilot controlled semi-conductors being coupled to gate circuits including secondary windings respectively of a pulse transformer, said pilot controlled semi-conductors having their anode-cathode circuits coupled respectively to the windings of a saturable reactor, and said static switching circuit including an additional controlled semi-conductor coupled to one of said gate circuits in by-passing relation to said saturable reactor.

5. The combination according to claim 4 wherein capacitance means are coupled in each of said anode-cathode circuits for firing said pilot semi-conductors a predetermined number of electrical degrees following a pulse from said pulse transformer.

6. The combination according to claim 5 wherein a phasing circuit is coupled to a primary winding of said pulse transformer for adjusting said number of electrical degrees.

7. A power controlling circuit for switching and proportioning current flows between an A.C. source and an A.C. load, said circuit comprising a number of power controlled semi-conductors coupled between said load and said source, a gate circuit for each of said controlled semi-conductors, a pilot controlled semi-conductor connected in each of said gate circuits, and a static switching circuit for firing said pilot controlled semi-conductors to trigger said power controlled semi-conductors in advance of the respective current reversals at said power controlled semi-conductors, so that succeeding current reversals by said source fire said controlled semi-conductors respectively and precisely at the instant of such reversals, at least some of said pilot controlled semi-conductors being coupled respectively to the gates of their associated controlled semi-conductors through transformer means succeeding ones of said pilot controlled semi-conductors having their gate circuits coupled successively to said transformer means in slaving relationship.

8. The combination according to claim 7 wherein one of said pilot controlled semi-conductors has its cathode connected directly to the gate of the associated one of said power controlled semi-conductors.

References Cited
UNITED STATES PATENTS

| | | | |
|---|---|---|---|
| 3,281,645 | 10/1966 | Spink | 307—252 X |
| 3,319,152 | 5/1967 | Pinckaers | 323—22 (Scr) |
| 3,436,645 | 4/1969 | Johnson et al. | 323—24 |
| 3,443,204 | 5/1969 | Baker | 323—24 |

J D MILLER, Primary Examiner

A. D. PELLINEN, Assistant Examiner

U.S. Cl. X.R.

323—22, 24, 38